May 9, 1933.  S. PLOTKIN  1,907,574

AUTOMATIC BACK ROLL CHECK

Filed March 18, 1932

INVENTOR
Samuel Plotkin
BY
ATTORNEY

Patented May 9, 1933

1,907,574

UNITED STATES PATENT OFFICE

SAMUEL PLOTKIN, OF FREEPORT, NEW YORK

AUTOMATIC BACK-ROLL CHECK

Application filed March 18, 1932. Serial No. 599,681.

This invention relates to new and useful improvements in a back-roll check.

The need of a good back-roll check on motor vehicles has long been recognized. A great difficulty exists when a vehicle is running up an incline and is caused to stop. When attempting to start again, unless the driver is quite experienced, the vehicle will roll slightly backwards which may cause damage to another vehicle behind it. There are numerous systems used to prevent such back-rolling. These systems generally are hard upon the clutch or need the operation of an experienced driver.

It is an object of this invention to construct a back-roll check which is automatic in operation and which makes use of the emergency brake of the vehicle to cause the checking.

As another object of this invention it is proposed to take advantage of the law of momentum in the operation of the back-rolling check device in a manner so that the emergency brake is automatically applied when the vehicle attempts to roll backwards, but when moved frontwards it is free.

A still further object of this invention is to construct the automatic back-roll check in a manner so that no parts are in operation when the vehicle is traveling frontwards.

A still further object of this invention is the construction of a device of the class described which is of simple, durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 2:
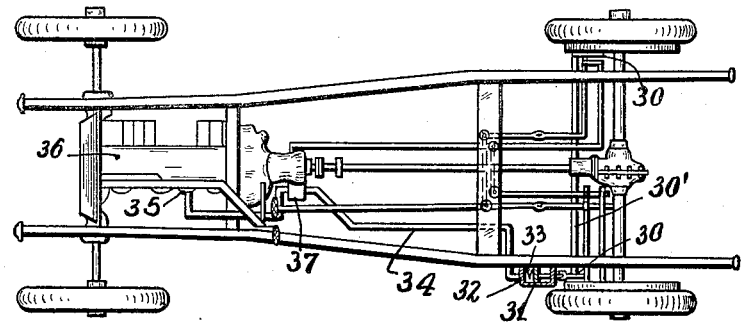
Fig. 2 is a schematic plan view showing the control for the back-roll check to cause it to be inoperative when the vehicle is moving backwards.
Figure 1:
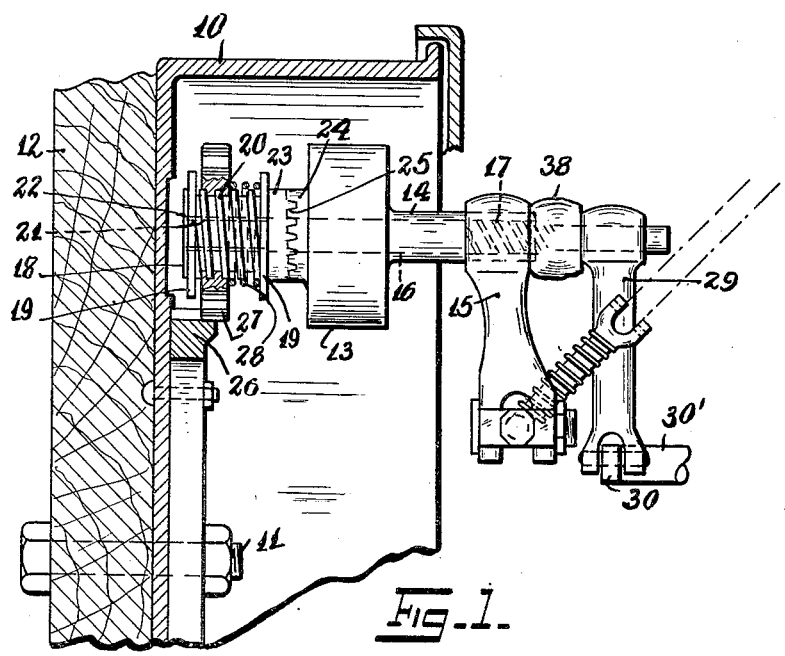
Fig. 1 is a fragmentary sectional view of a wheel with a brake and showing the back-roll check applied.

The automatic back-roll check is used in combination with the emergency brake of a vehicle though it may be used with any of the other brakes with equal advantage. More particularly, the reference numeral 10 indicates the brake drum which is attached by bolts 11 upon the wheel 12. The brake shoe is not shown on the drawing but it is operated against the inside of the drum by the expansion cam 13 which is of conventional construction and generally known and need not be given in detail here. The cam 13 is shown connected with a hollow shaft 14 upon which there is connected an arm 15 for connection with a standard mechanism to operate the brake. A portion of the standard mechanism is shown but the details thereof will not be gone into here since they form no part of this invention. A shaft 16 extends through the hollow shaft 14 and through the cam 13 and has a portion 17 threadedly engaging a portion of the hollow shaft 14.

A roller 18 is mounted upon the rear end of the shaft 16. This roller has end flanges 19 and an intermediate peripheral threaded portion 20. The roller is free to rotate upon the shaft 16 but is held against sliding thereon. This is accomplished by a reduced portion 21 of the shaft 16 and riveting at 22 the end of the shaft against the end of the roller. Interposed between the roller 18 and the cam 13 are hub sections 23 and 24 having inter-engaging teeth 25. The hub section 23 is rigidly attached upon the roller while the hub section 24 is rigidly attached upon the cam. A gear 26 is attached upon the inside of the drum 10 preferably by the same bolts which attach the drum upon the wheel. This gear engages a gear 27 upon the roller 14. The gear 27 threadedly engages the threads 20 upon the roller and is urged towards the end of the roller by a spring 28 coaxially wound upon the roller and acting against the front flange 19.

A lever 29 is fixed upon the extended free end of the shaft 16. This lever connects with a link 30 movable by a piston 31 within a vacuum cylinder 32. This piston is urged in one direction by a spring 33. The cylinder 32 is connected with a vacuum line 34 in connection with the intake 35 of the engine 36 of the vehicle. A valve 37 is arranged within the line 34 and operable automatically when the shift of the vehicle is to the reverse position. A leather covering 38 is shown engaging over the threads 17 so as to prevent grit and dirt from reaching them. While the suction method has been shown for operating the lever 29 to allow reverse operation of the vehicle, this is not intended as a limitation since any other method may be used. Normally, when the car is standing still the spring 28 will force the gear 27 towards the free end of the roller 18 and into mesh with the gear 26.

In the event that the car starts frontwards, the gear 27 will be turned upon the roller 18 so as to disengage from the gear 26. This is so in that the roller 18, due to the law of momentum tends to remain stationary and the gear 27 consequently travels along the threads 20. In the event that the car rolls backwards the gear 26 will turn in the opposite direction and turn the gear 27 correspondingly. The gear 27 tends to travel against the end flange 19 of the roller where the clutch jams and causes turning of the roller. This turning is transmitted by the teeth 25 to the cam 13 which operates the brake shoes against the drum 10. The cam 13 may be operated whenever desired by the conventional brake lever which operates the arm 15 to cause turning of the cam to apply the brake.

In the event that the driver of the vehicle intends the vehicle to go backwards when he moves the customary shift into reverse the valve 37 will be operated to allow the suction to reach the cylinder 31 and cause the piston within the cylinder to move the arm 29 which turns the shaft 16. As the shaft turns it will advance due to the threads 17 and disengage the teeth 25. Now then, as the wheel of the car turns backwards, the gear 27 will be jammed against the free end of the roller to turn but this rotation will not be transmitted to the cam 13 since the teeth 25 are out of engagement. Consequently, the car may move backwards. An arm 30' connects links 30 at both rear wheel brake drums for the purpose of checking the back rolling of both wheels simultaneously.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a vehicle brake drum and a cam for urging the brake shoes against the drum, a hollow shaft fixed upon the front side of said cam, a lever on said shaft for operating the cam in the operation of the brake, a shaft through said hollow shaft and cam and threadedly engaged therewith to advance relative to the cam upon rotation, a roller with a peripheral thread and end flanges rotative and non-slidable on the rear of said shaft, inter-engaging teeth on adjacent faces of said roller and cam, a gear attached upon said brake drum, a gear threadedly engaged upon the peripheral teeth of said roller and normally meshing with said first gear, resilient means urging said second gear towards the rear of the roller into the meshing position, and a lever on said shaft to turn the shaft for disengaging said teeth.

2. In combination with a vehicle brake drum and a cam for urging the brake shoes against the drum, a hollow shaft fixed upon the front side of said cam, a lever on said shaft for operating the cam in the operation of the brake, a shaft through said hollow shaft and cam and threadedly engaged therewith to advance relative to the cam upon rotation, a roller with a peripheral thread and end flanges rotative and non-slidable on the rear of said shaft, inter-engaging teeth on adjacent faces of said roller and cam, a gear attached upon said brake drum, a gear threadedly engaged upon the peripheral teeth of said roller and normally meshing with said first gear, resilient means urging said second gear towards the rear of the roller into the meshing position, and a lever on said shaft to turn the shaft for disengaging said teeth, a portion of the threads from said shaft extending from the end of the hollow shaft, and a cover over these threads to prevent grit and dirt from reaching them.

3. In combination with a vehicle brake drum and a cam for urging the brake shoes against the drum, a hollow shaft fixed upon the front side of said cam, a lever on said shaft for operating the cam in the operation of the brake, a shaft through said hollow shaft and cam and threadedly engaged therewith to advance relative to the cam upon rotation, a roller with a peripheral thread and end flanges rotative and non-slidable on the rear of said shaft, inter-engaging teeth on adjacent faces of said roller and cam, a gear attached upon said brake drum, a gear threadedly engaged upon the peripheral teeth of said roller and normally meshing with said first gear, resilient means urging said second gear towards the rear of the roller into the meshing position, and a lever on said shaft to turn the shaft for disengaging said teeth, said roller being mounted upon a reduced end of said shaft to accomplish the rotative and non-slidable mounting.

4. In combination with a vehicle brake drum and a cam for urging the brake shoes against the drum, a hollow shaft fixed upon the front side of said cam, a lever on said shaft for operating the cam in the operation of the brake, a shaft through said hollow shaft and cam and threadedly engaged therewith to advance relative to the cam upon rotation, a roller with a peripheral thread and end flanges rotative and non-slidable on the rear of said shaft, inter-engaging teeth on adjacent faces of said roller and cam, a gear attached upon said brake drum, a gear threadedly engaged upon the peripheral teeth of said roller and normally meshing with said first gear, resilient means urging said second gear towards the rear of the roller into the meshing position, and a lever on said shaft to turn the shaft for disengaging said teeth, said inter-engaging teeth being located upon hubs connected respectively on adjacent sides of said roller and said cam.

5. In combination with a vehicle brake drum and a cam for urging the brake shoes against the drum, a hollow shaft fixed upon the front side of said cam, a lever on said shaft for operating the cam in the operation of the brake, a shaft through said hollow shaft and cam and threadedly engaged therewith to advance relative to the cam upon rotation, a roller with a peripheral thread and end flanges rotative and non-slidable on the rear of said shaft, inter-engaging teeth on adjacent faces of said roller and cam, a gear attached upon said brake drum, a gear threadedly engaged upon the peripheral teeth of said roller and normally meshing with said first gear, resilient means urging said second gear towards the rear of the roller into the meshing position, and a lever on said shaft to turn the shaft for disengaging said teeth, said resilient means for urging said second gear into meshing position comprising a spring mounted upon said roller and acting between one of said flanges and the side of said second gear.

6. In combination with a vehicle brake drum and a cam for urging the brake shoes against the drum, a hollow shaft fixed upon the front side of said cam, a lever on said shaft for operating the cam in the operation of the brake, a shaft through said hollow shaft and cam and threadedly engaged therewith to advance relative to the cam upon rotation, a roller with a peripheral thread and end flanges rotative and non-slidable on the rear of said shaft, inter-engaging teeth on adjacent faces of said roller and cam, a gear attached upon said brake drum, a gear threadedly engaged upon the peripheral teeth of said roller and normally meshing with said first gear, resilient means urging said second gear towards the rear of the roller into the meshing position, a lever on said shaft to turn the shaft for disengaging said teeth, and means for moving said latter-mentioned lever automatically upon placing of the shift of the vehicle into reverse.

7. In combination with a vehicle brake drum and a cam for urging the brake shoes against the drum, a hollow shaft fixed upon the front side of said cam, a lever on said shaft for operating the cam in the operation of the brake, a shaft through said hollow shaft and cam and threadedly engaged therewith to advance relative to the cam upon rotation, a roller with a peripheral thread and end flanges rotative and non-slidable on the rear of said shaft, inter-engaging teeth on adjacent faces of said roller and cam, a gear attached upon said brake drum, a gear threadedly engaged upon the peripheral teeth of said roller and normally meshing with said first gear, resilient means urging said second gear towards the rear of the roller into the meshing position, a lever on said shaft to turn the shaft for disengaging said teeth, and means for moving said latter-mentioned lever automatically upon placing of the shift of the vehicle into reverse, comprising a suction line connected with a cylinder provided with a piston in connection with said lever, and a valve interposed in said line and operated when the shift is placed in reverse.

In testimony whereof I have affixed my signature.

SAMUEL PLOTKIN.